(12) United States Patent
Hunt

(10) Patent No.: US 11,489,860 B2
(45) Date of Patent: Nov. 1, 2022

(54) IDENTIFYING SIMILAR ASSETS ACROSS A DIGITAL ATTACK SURFACE

(71) Applicant: Microsoft Technology Licensing, LLC, Redmond, WA (US)

(72) Inventor: Adam Hunt, El Cerrito, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 16/590,259

(22) Filed: Oct. 1, 2019

(65) Prior Publication Data

US 2021/0099477 A1 Apr. 1, 2021

(51) Int. Cl.
*H04L 9/40* (2022.01)

(52) U.S. Cl.
CPC ............... *H04L 63/1433* (2013.01)

(58) Field of Classification Search
CPC ................................................ H04L 63/1433
See application file for complete search history.

(56) References Cited

U.S. PATENT DOCUMENTS

| | | | | |
|---|---|---|---|---|
| 9,479,519 | B1 * | 10/2016 | Hill | H04L 63/1441 |
| 9,578,048 | B1 * | 2/2017 | Hunt | H04L 63/1416 |
| 9,621,588 | B2 * | 4/2017 | Chan | H04L 67/10 |
| 9,692,778 | B1 * | 6/2017 | Mohanty | G06F 21/50 |
| 10,404,723 | B1 * | 9/2019 | Mushtaq | H04L 63/1416 |
| 10,673,880 | B1 * | 6/2020 | Pratt | H04L 63/1425 |
| 10,764,313 | B1 * | 9/2020 | Mushtaq | G06N 20/20 |
| 2012/0117664 | A1 * | 5/2012 | Ezell | G06F 21/57 709/217 |
| 2016/0080410 | A1 * | 3/2016 | Gorny | H04L 63/101 726/25 |
| 2018/0136921 | A1 * | 5/2018 | Pfleger De Aguiar | G06Q 10/06 |
| 2018/0173685 | A1 * | 6/2018 | Christodorescu | G06F 21/577 |
| 2018/0262529 | A1 * | 9/2018 | Allen | H04L 63/061 |
| 2020/0167786 | A1 * | 5/2020 | Kursun | H04L 67/22 |
| 2020/0177615 | A1 * | 6/2020 | Grabois | H04L 63/20 |
| 2020/0177619 | A1 * | 6/2020 | Hadar | H04L 63/20 |
| 2020/0389478 | A1 * | 12/2020 | Abbaszadeh | H04L 63/1475 |
| 2021/0006574 | A1 * | 1/2021 | Venter | G06N 5/04 |
| 2021/0012012 | A1 * | 1/2021 | Soroush | G06N 5/04 |
| 2021/0081539 | A1 * | 3/2021 | Karin | G06F 11/3065 |

FOREIGN PATENT DOCUMENTS

EP 2975534 A1 * 1/2016 ......... G06F 17/30905

* cited by examiner

*Primary Examiner* — Sarah Su
(74) *Attorney, Agent, or Firm* — Wade IP Law PLLC

(57) ABSTRACT

Similar assets across a digital attack surface are identified. Extracting detail information and related edge information enables a network analysis system to provide indexed assets. A user of a network analysis system may provide additional data sources to enhance indexed assets. New data sources are processed in bulk to update existing assets. Edge information is pre-computed to provide on-demand access to a global inventory of mapped domain infrastructure assets.

20 Claims, 5 Drawing Sheets

IDENTIFYING SIMILAR ASSETS ACROSS A DIGITAL ATTACK SURFACE

TECHNICAL FIELD

The present invention relates generally to clustering techniques, and in particular, to identifying similar assets across a digital attack surface.

BACKGROUND

As the use of the Internet and the amount of information available on the Internet has expanded, the ability to track and monitor information available over the Internet related to a particular subject or associated with a particular entity has been negatively impacted. The vast amount of information present on the Internet makes monitoring websites nearly impossible as it is difficult to quickly and efficiently compare the large amount of information contained within the large number of websites that may be associated with an entity. These challenges extend to the enterprise environment, in which an enterprise is faced with the burden of monitoring thousands of web documents accessed throughout an enterprise network including enterprise websites. In an enterprise system having thousands of electronic documents (e.g., documents provided via a website), compliance and security of the enterprise network and the enterprise website becomes difficult to manage.

Of the many challenges faced with network security in any type of computing system (e.g., enterprise system or a cloud computing system), web documents for a website may compromise the security of the enterprise system. Electronic documents for a website may include or implement one or more web components, designed to support a web-based feature, such as content management. For example, web documents may be designed to support a web framework for managing content provided for the web document. The web framework may be defined by multiple, different types of web components. Examples of web frameworks may include proprietary solutions such as WordPress®, Drupal®, Joomla®, and Concrete5®. A web component in an electronic document for a website may undergo several versions through its lifetime. The versions of a website can correspond to changes in a web component due to version changes in a web framework using the web component. The changes in the versions may be difficult to track for a large website. An entity managing a website hosting many web documents may desire to consolidate different web frameworks, or even different versions of web frameworks. The consistency in web frameworks for a website may enable users that manage the website (e.g., an administrator or an operations analyst) to better manage security and operations of a website. By limiting and identifying web framework usage, the security and operation of a website can be improved. Some web components and/or web frameworks may have or expose security vulnerabilities to a website that may go undetected if not discovered in the website. Some websites may implement multiple different web frameworks, each of which may have shared or conflicting vulnerabilities. Some vulnerabilities of a web framework may be exposed by an older version that enable malicious third parties to hide malicious code from an entity's domain names without such entity knowing that any changes have occurred or that such domains have been taken over by malicious code. As such, it is difficult to ensure that bad actors are not altering, misappropriating, and/or otherwise compromising or exploiting data, including ways that interfere with privacy, or damage an entity's intangible business assets, such as intellectual property and goodwill.

Accordingly, businesses are challenged to find ways to accurately and periodically identify and detect changes in a web framework and/or web components of documents hosted by a website. Detecting changes in a web document, in particular web framework changes, becomes paramount in dealing with security of a network, such as a network within an enterprise system. Many web frameworks provide a publicly accessible file in an administrative directory that contains the exact version installed. Using targeted (or active) crawling, the file can be downloaded and the version of the framework determined with little trouble. However, this method may not be feasible for organizations with particularly large footprints. For example, a movie studio may be generating new web content to support upcoming new movies on a monthly or weekly basis, generating hundreds or thousands of websites under the control and management of the movie studio. Scanning for vulnerabilities on all of the websites being generated on a continuous basis is costly, inefficient, and degrades the user experience of the websites due to performance while a website is taken down for vulnerability scanning Additionally, gathering accurate and relevant information about each website, including components and attributes of websites, is an ongoing and costly exercise in terms of computing resources and management.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
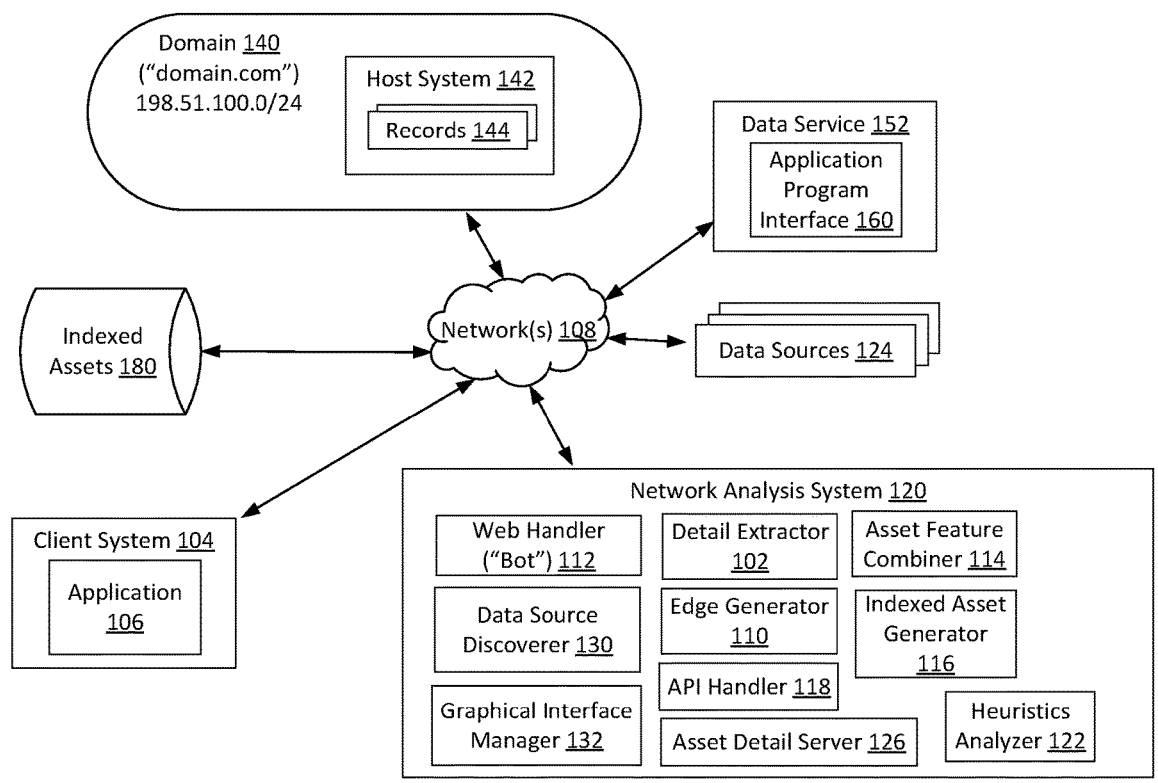
FIG. 1 illustrates an example high-level block diagram, including an example network analysis system.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
3.0. Example Embodiments
4.0 Implementation Mechanism—Hardware Overview
5.0. Extensions and Alternatives

1.0 GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein can be used by a network analysis system to gather information from data sources to map domain infrastructure assets. Previously, given a domain name, a list of related nodes, or connected devices on a network, may be detected by the network analysis system to pull information from data sources and generate a digital "footprint" for monitoring and management by the network analysis system. However, this process is resource intensive and leads to inaccurate information due to the rapid pace of change in the data infrastructure environment on the Internet today. Instead of pulling, or requesting information, from data sources to detect a web framework, a network analysis system may process data sources to extract detail information about one or more assets that describe domain infrastructure on the Internet. The extracted detail information about the one or more assets creates a "digital attack surface" where an entity may be vulnerable. In a sense, the methods, techniques, and processes described herein enable the network analysis system to build sets of partially detailed assets from multiple data sources using information extracted from those data sources. Then, in an embodiment, using a various methods, assets and edges may be merged based on related information, node centrality, and so forth. Merged assets and edges may then be indexed such that new information that may be received in the future from other data sources may be incorporated into the mapped detailed asset. As a result, the domain infrastructure of all web documents on the Internet may be processed in this fashion to create a global inventory of labels, where each label has a corresponding confidence level based on the processed data sources.

For example, a customer may have control over 40,000 to 50,000 websites that they wish to perform a vulnerability scan to determine weakness in the infrastructure of their websites. Instead of building out a completely siloed digital footprint for the customer by executing a document object model (DOM) object for each website to transform each page component into a hashed binary signature, the customer would instead rely on a global inventory of the mapped domain infrastructure of the Internet. The 40,000 to 50,000 websites under the control of the customer could already be mapped, and the customer may add their own information about those enumerated websites, thus adding to the confidence level of the labels of those sites as under the control and management of the customer. This enables the customer to rely on continuously added data sources performed by the network analysis system to increase the accuracy and confidence level of labeling data components of potential vulnerabilities.

Edges are also generated in a graph between nodes, or informational attributes about assets, based on the information gathered from data sources. For example, a group of data nodes, such as domain hosts, may share similar or same routing protocols, such as Border Gateway Protocol (BGP) prefix Internet Protocol (IP) block, or use the same autonomous systems (AS) on the Internet. If an asset shares the same or similar routing protocols, an edge may be created that informs the level of connection. Other features that may indicate a connection between nodes may include IP headers, or header information at the beginning of an IP packet. Many different features may be used to compute an edge between two graph nodes, and the features may be weighted using a linear combination, in an embodiment.

The result of generating indexed assets that describe a global inventory of the Internet is increased efficiency in vulnerability scanning. Vulnerability scanning is resource-intensive and may cause performance delays on the websites being scanned. As a result, by pre-computing edges between indexed assets to be scanned, a performance increase is gained while also ensuring that vulnerabilities in the infrastructure of websites may be captured and identified. Vulnerability scanners may be third-party vendors contracted to perform the vulnerability scans. Thus, by pre-computing the edges between indexed assets, vulnerability scans are more effective, efficient, and reduces the vulnerability budget while also increasing overall website performance.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 FUNCTIONAL OVERVIEW

FIG. 1 shows a high-level block diagram of a system 100 according to an embodiment of the present disclosure. One or more of the below-described techniques may be implemented in or involve one or more computer systems. The computing environment in FIG. 1 is not intended to suggest any limitation as to scope of use or functionality of described embodiments.

System 100 may include one or more client systems 104 (referred to herein as "client system" or "client") and network analysis system 120. Network analysis system 120 may be implemented by a computing system. Client system 104 may be operated by one or more users (e.g., user 102, not illustrated), such as a network analyst whose role it is to assess network activity.

Client system 104 may include an interface, such as a physical interface, a graphical interface (e.g., a graphical user interface), or a combination thereof. A graphical interface may be generated by client system 104, received from network analysis system 120, or a combination thereof. The graphical interface may be updated or modified by client system 104 or network analysis system 120 in response to interaction with the interface. The interface may be provided by network analysis system 120 via network 108 as part of a service (e.g., a cloud service) or application. In some embodiments, client system 104 may provide access to one or more applications 106 ("app"). App 106 may enable a user to access and perform services provided by network analysis system 120. In some embodiments, app 106 may enable a user, e.g., a network administrator or analyst to control and view web framework monitoring for documents. In particular, app 106 can enable a user to view relevant information available on a mapped domain infrastructure. The app 106 can provide information indicating the name and version of a mapped domain infrastructure relevant to the user. For example, public data sources 124 may be used to generate a global inventory of domain infrastructure assets that may be accessible to the user through the application 106 on the client system 104.

Accordingly, embodiments are capable of providing detail information, in real-time, mapped from data sources to indexed assets of all domains on the Internet. Thus, embodiments provide a deeper understanding of connections between assets, or edges, as pre-computed by the network analysis system. Accordingly, the deeper understanding of connections may enable a user to accurately assess vulnerabilities of a website by identifying connected assets. As such, embodiments provide a deeper understanding of website behavior by analyzing the full activity and functionality associated with a website, email, or other Internet-connected device rendering documents. The functionality may be used to identify security and performance issues with documents. The issues may be used to determine a change in a particular web asset, component and/or web framework identified by the pre-computed edges.

A web component may define an object in a document defined by a DOM. A web component may be a widget that is reusable for providing functionality or content to a document. A web component may specify a location or a source of content (e.g., code or data) in a document. Examples of web components may include, without limitation, JavaScript, cascading style sheets (CSSs), or images.

A web framework may be a programming framework supporting functionality for documents in applications including web applications (e.g., web services, web resources, and web application programming interfaces (APIs)). A web framework may define a common functionality for web documents. A web framework may be defined by one or more libraries and templates. A web framework may be hosted in a system by a provider of the web framework, or a repository system that provides access to the framework.

Client system 104 and network analysis system 120 may be communicatively connected via one or more communication networks 108. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols, such as IEEE 802.XX suite of protocols, TCP/IP, IPX, SAN, AppleTalk, Bluetooth®, and other protocols.

Network analysis system 120 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up network analysis system 120 may run any of a number of operating systems or a variety of additional server applications and/or mid-tier applications, such as HTTP servers, FTP servers, CGI servers, Java servers, database servers, and the like. Exemplary database servers include without limitation those commercially available from Microsoft, and the like. In one example, network analysis system 120 may include a RiskIQ™ product or service, which provides digital footprint management or monitoring of network activity with regard to network assets. In various embodiments, network analysis system 120 may be configured to run one or more services or software applications described in the foregoing disclosure. For example, network analysis system 120 may correspond to a computing system for performing processing as described herein according to an embodiment of the present disclosure.

In some embodiments, network analysis system 120 may be implemented as an enterprise computing system or a cloud computing system comprising one or more computers and/or servers that may include those described above. Network analysis system 120 may include several subsystems and/or modules, including some, which may not be shown. For example, network analysis system 120 may include data source discoverer 130, web handler ("BOT") 112, graphical interface manager 132, detail extractor 102, edge generator 110, asset feature combiner 114, indexed asset generator 116, API handler 118, heuristics analyzer 122, and asset detail server 126. Network analysis system 120 may have more or fewer subsystems and/or modules than shown in the figure, may combine two or more subsystems and/or modules, or may have a different configuration or arrangement of subsystems and/or modules. Subsystems and modules of network analysis system 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analysis system 120 may also provide other services or software applications that can include non-virtual and virtual environments. In some embodiments, these services may be offered as web-based or cloud services or under a Software as a Service (SaaS) model to the users of client system 104. The services offered by network analysis system 120 may include application services. Application services may be provided by network analysis system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in network analysis system 120, which may be implemented as a cloud infrastructure system. Users can acquire the application services without the need for customers to purchase separate licenses and support. Various different SaaS services may be provided. Users operating client system 104 may in turn utilize one or more applications to interact with network analysis system 120 to utilize the services provided by subsystems and/or modules of network analysis system 120.

Network analysis system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in network analysis system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some embodiments, computer-readable storage media may be configured to protect a computer from an electronic communication containing malicious code. The computer-readable storage media may include instructions stored thereon, that when executed on a processor, perform the operations described herein.

System 100 may also include or be coupled to one or more data sources, which may be implemented using any type of persistent storage device, such as a memory storage device or other non-transitory computer readable storage medium. In some embodiments, local storage may include or implement one or more databases (e.g., a document database, a relational database, or other type of database), one or more file stores, one or more file systems, or combinations thereof. For example, system 100 may be coupled to or may include one or more data sources 124 or data repositories such as indexed assets database 180. The indexed assets database 180 may be controlled by a third party, in an embodiment. Examples of repository systems include, without limitation, GitHub® and Apache Subversion® (SVN). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources may be accessible by network analysis system 120 using network 108.

System 100 may also include or be coupled to additional storage, which may be implemented using any type of persistent storage device, such as a memory storage device or other non-transitory computer readable storage medium. In some embodiments, local storage may include or implement one or more databases (e.g., a document database, a relational database, or other type of database), one or more file stores, one or more file systems, or combinations thereof. For example, system 100 may be coupled to or may include one or more data stores. Data stores may be included in or accessible by a network analysis system 120. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 134 may be a network-accessible store accessible by network analysis system 120 using network 108.

Data sources 124 can be used to provide detail information about domain infrastructure for extraction and mapping to a database of indexed assets 180. Data sources 124 may be publicly available resources, such as a whois database. Data sources 124 may also include private data sources, such as proprietary databases and third party databases where data is licensed for access. The results of the processes disclosed herein may be stored in the database of indexed assets 180 that may be searchable, modifiable, and accessible by network analysis system 120. Client system 120 may access data stored in indexed assets 180 using app 106.

System 100 may include one or more network domains (e.g., an Internet domain), such as domain 140. Domain 140 may provide one or more websites. Each domain may be implemented by a host system, which implements a domain name server (DNS) for the domain. The DNS may maintain a directory of domain names and translate, or resolve them to Internet Protocol (IP) addresses. Domain 140 may include a host computing system 142. Host computing system 142 may stores records 144 to implement a DNS for domain 140. Domain 140 may be mapped (e.g., via DNS) to one or more IP addresses.

System 100 may implement one or more techniques for web crawling. For example, network analysis system 120 may implement a web handler 112 (e.g., a "bot") to handle communications on the network 108. Web handler 112 may communicate with elements in system 100. Specifically, web handler 112 can send requests (also referred to herein as "dependent requests" and "web requests") for each web component identified in a document. Web handler 112 can receive responses (also referred to herein as "web responses" and "dependent responses") to requests. A request for a web component may be sent to a source specified by an object in a document defined by the web component. The response may be received from a source. The source may be the same as a source of a document that includes the web component. The source can be different from a source of the document. Web handler 112 can crawl the Internet, in particular websites, such as a website provided by host system 142. Web handler 112 may be implemented by or as a part of network analysis system 120, or may be initiated on network 108.

Web handler 112 may passively or actively crawl the Internet for websites. Web handler 112 may mimic operation of a web application (e.g., a web browser) to render webpages. For example, web handler 112 may cause web documents (e.g., web pages) of a website to be rendered. Web handler 112 may actively monitor websites by probing a host system 142 of a website for a configuration file or information about a website, including web frameworks that are used. However, such techniques may be obstructive and unreliable. Web handler 112 may implement passive techniques to assess a website for web framework. For example, web handler 112 may send requests (e.g., dependent requests) and receive responses (e.g., dependent responses) for accessing a web component. Such web requests may be dependent on a web framework for a web document. Web handler 112 may passively monitor web requests for web documents of a website. Web handler 112 may perform operations disclosed herein for monitoring web documents and web requests.

The network analysis system 120 may include other functionality described in related applications, including "Techniques for Web Framework Detection," U.S. Published Patent Application No. 2017/0308513, filed on Apr. 26, 2017 and "Identifying Phishing Websites Using DOM Characteristics," U.S. Pat. No. 9,578,048, filed on Nov. 11, 2015, both hereby incorporated by reference. For example, DOM Characteristics may be a data source 124 used to generate edges by the edge generator 110. Existing edges may be precomputed for indexed assets 180 using web frameworks, in an embodiment. Graphical interface manager 132 may perform operations disclosed herein for generating, displaying, and presenting a graphical interface.

A detail extractor 102 extracts detail information from data sources 124, in an embodiment. As mentioned above, a network analysis system 120 uses multiple data sources 124 to generate partially detailed assets. Data sources 124 may be public, such as a whois database. In other embodiments, data sources 124 may be specific to a particular customer. The detail extractor 102 extracts relevant detail information about assets, or nodes in a graph representing domains, hosts, and other components, as well as the edges between the nodes, or the connection information describing the relationship. As a result, the detail extractor 102 provides a mapping function of data sources 124 to partially detailed assets.

An edge generator 110 precomputes an edge between two graph nodes that represent assets in the network analysis system 120 using information extracted from data sources 124. Various methods and techniques may be used to compute the edge between two graph nodes. For example, node centrality algorithms may be used to compute whether a cluster of nodes may be assigned a particular score based on how similar they are to each other. As another example, a confidence score may be used when there is 100% confidence that two assets are related, such as an IP address belonging to an IP block. In other embodiments, business criteria (e.g., a rule such as only including web sites with a 200 response code as assets) may be applied to generate edges between assets.

A precomputed edge is defined as a weighted linear combination of features. An asset feature combiner 114 determines how similar two nodes are based on a particular feature and contributes to the computation of the precomputed edge. For example, if two nodes share the same BGP prefix IP block, then they may have a feature score of 1 for that feature. Many different features may be used to define the edge between assets. Each feature may be weighted by a customer and/or administrator of the network analysis system 120. Partially detailed assets may then be merged and combined into assets and edges using the asset feature combiner 114 and edge generator 110. An indexed asset generator 116 maps the merged assets and edges to generate new or integrate with existing indexed assets in the indexed assets database 180. A graphical user interface may be used to tune the weights for features in the precomputed edge, in an embodiment. The graphical interface manager 132 may provide such a graphical user interface, in an embodiment.

An API (application programming interface) handler 118 may be used to receive data from other systems connected to the network analysis system 120 through one or more networks 108. For example, a client system 104 may, through the application 106, communicate a different weight to be used for a feature in the precomputed edge. The API handler 118 may receive that information related to the different weight. Other APIs may be used to receive and transmit data at the network analysis system 120 to connected systems through one or more networks 108, in various embodiments. For example, a data service 152, such as a third party system that scans for vulnerabilities, may include an application program interface 160 to interface with the network analysis system 120. The API handler 118 may manage the data received and/or transmitted to the data service 152, in this example.

A heuristics analyzer 122 uses a set of heuristics, or rules, to handle one or more various situations. For example, an identifier may be used to identify a particular set of nodes, but may not actually represent a host system or connected device. A heuristic is used to ignore such an identifier in generating precomputed edges. As another example, a potential threat actor may send the same phishing kit with minor changes in page content, such as a logo change, but keeping many of the same web components, such as redirects and links to malicious content. A heuristic may be used to determine that the set of related nodes to a known phishing kit may be tied to a potential threat actor, thus affecting the precomputed edges between the phishing kit nodes and legitimate nodes.

A data source discoverer 130 inputs new data sources 124 for processing by the network analysis system 120. For example, a customer may provide a list of known websites under control of the customer. These websites each have a precomputed edge of 1 in association with the asset associated with the customer, such as a brand. Other data sources may be discovered by web crawlers and/or bots 112 and may processed by the data source discoverer 130.

An asset detail server 126 provides detail information about an indexed asset. The asset detail server 126 may retrieve information from the database of indexed assets 180 and generate a detail information responsive to the request. The detail information may be presented by the asset detail server 126 to a client system 104, for example, in an application 106 or to a data service 152, such as a third party vulnerability scanner, through an application program interface 160.

Figure 2:
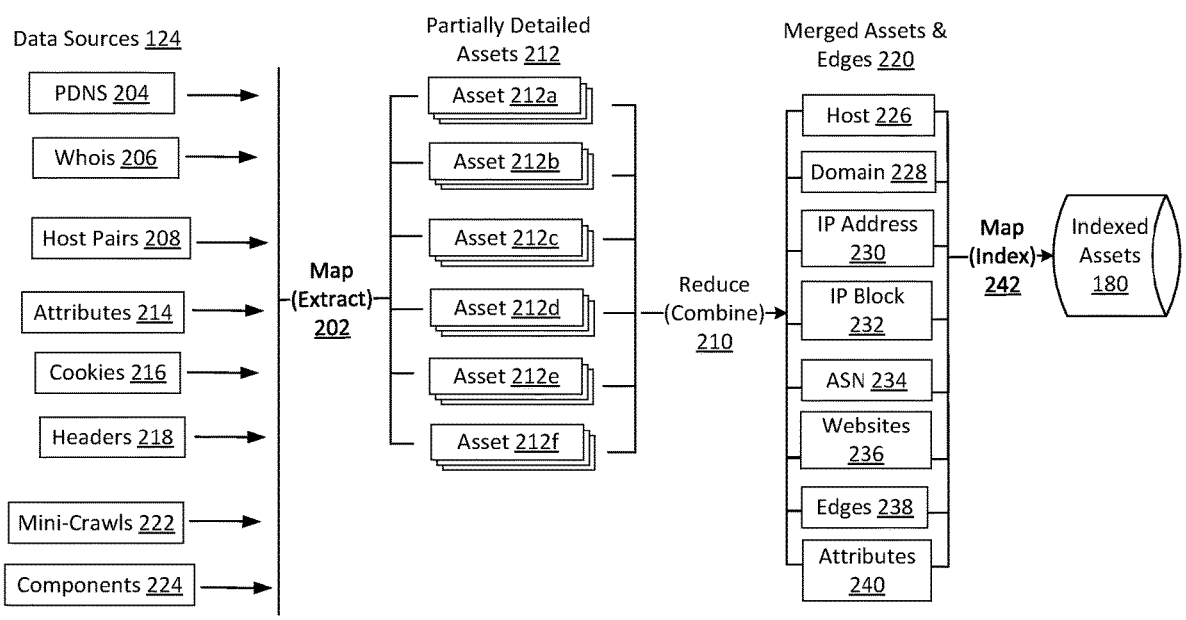
FIG. 2 illustrates an example high-level block diagram.

FIG. 2 illustrates an example high-level block diagram, in an embodiment. As used in FIG. 2, the process has been illustrated as an abstraction to a few functions. Using a MapReduce adapter pattern technique, data is extracted 202, then combined 210, and then indexed 242, in an embodiment. Data is extracted 202 by converting data sources 124 as input Protobuf messages to output Protobuf messages, in an embodiment. Then, data is combined 210 by merging two Protobuf messages of the same type together. Finally, data is indexed 242 by creating a unique identifier that is used to partition and sort the data based on the Protobuf message. While Protobuf messages are used here, any type of language-neutral, platform-neutral, and/or extensible mechanism for serializing structured data may be used. In this way, large raw datasets (e.g., data sources 124) are processed into various MapReduce jobs which create the partially detailed assets 212 which are then processed using another combiner process to distill the data into aggregated datasets. Breaking down the processing into daily and other incremental periods builds a robust and comprehensive detailed global inventory of mapped domain infrastructure. Advantages of this technique include the ability to update the schema at any time, the ability to recreate the index at any time, and providing sequential access results in orders of magnitude faster access than random access of a database. This method of detailing information about assets also provides a higher throughput of requests by using a Sob index, in an embodiment.

Data sources 124 may include a wide variety of information sources, including but not limited to PowerDNS (PDNS) 204, Whois database 206, host pairs 208, attributes 214, cookies 216, headers 218, mini-crawls 222, and components 224. By analyzing and extracting information from data sources 124 through a map (extract) process 202, partially detailed assets 212 are generated. Assets 212a, 212b, 212c, 212d, 212e, and 212f are illustrated for example purposes. For example, a host system may include web content and a web component where a host system may represent "LionKing.com" which includes web content (e.g., text, images, audio/visual content, and the like) and a web component (e.g., input/output components, iFrames, tables, and so on). Instead of analyzing the domain name and identifying related information based on that analysis, often through a web framework DOM node execution, the method described above and in further detail below uses data sources to generate information that becomes related through the processes described. Thus, the network analysis system 120 may input a Whois data record 206, for example, that identifies a domain name of "LionKing.com" and its associated IP address. For purposes of illustration, the asset 212*a* is partially detailed based on the Whois data record 206. Another data source 124 may include header information 218. The header 218 is formatted to include control field information of an Internet datagram. Thus, data passed from and through "LionKing.com" includes headers 218 that may inform various connections and relationships to assets associated with the partially detailed asset 212*a*. It is understood that while only six partially detailed assets 212 are illustrated for the grouping of information embodied in assets 212*a*, 212*b*, 212*c*, 212*d*, 212*e*, and 212*f*, a multitude of partially detailed assets may be mapped and/or extracted 202 by a data source discoverer 130 (130 of FIG. 1) and detail extractor 102 (102 of FIG. 1). The partially detailed assets 212 illustrated in FIG. 2 are provided for simplicity and clarity.

Returning to the example, the host system for "LionKing.com" is also connected to an identifier which further indicates that "LionKing.com" is controlled and managed by a brand named DISNEY. Additionally, another host system may represent "Disney.com" and there may be a data source 124 fed to a network analysis system 120 that includes that connection. A partially detailed asset 212 may exist for the brand DISNEY, the host system that represents "Disney.com" and countless other pieces of relevant information. For simplicity, two data sources 124, such as two Whois 206 records for "LionKing.com" and "Disney.com" may generate numerous partially detailed assets 212. In a typical Whois 206 record, each piece of information may correspond to an asset. In an embodiment, business criteria are used to extract only certain types of information to start generating partially detailed assets 212, such as domain name, registry domain ID, registrar whois server, and so forth. A separate data source may identify a listing of registry domain IDs as related to a brand, such as DISNEY. The process of extracting or mapping the data sources 124 into partially detailed assets 212 may be performed by the detail extractor 102 (102 of FIG. 1). Because of the scale of data sources 124, the entire Internet may be mapped using this process which first extracts detail information into partially detailed assets 212.

Once a set of partially detailed assets 212 are generated from data sources 124, merged assets and edges 220 may be generated by an edge generator 110 and/or asset feature combiner 114. A typical merged asset and/or edge may include information such as a host 226, a domain 228, an IP address 230, an IP block 232, an autonomous system number (ASN), websites 236, edges 238, and attributes 240. The partially detailed assets 212 are reduced and/or combined 210 into the merged assets and edges 220. These merged assets and edges 220 are then indexed 242 into a database for indexed assets 180.

In order to keep the indexed assets 180 up to date, daily updates are performed, in some embodiments. For example, new daily data sources 124 may include active DNS lookups on labeled hosts, feeding a pdns pipeline 204. Active mini crawls 222 may be driven by labeled websites, feeding a hostaxis pipeline. Active domain whois lookups may be driven by labeled domains, feeding a whois pipeline 206. Countless business criteria may be created and used to generate and/or discover new data sources 124 to further enhance the accuracy of the indexed assets 180. Business criteria may be inputted by administrators of the network analysis system 120, through a user interface in an application 106 operating on a client system 104, or through an application program interface 160 on a data service 152, in various embodiments.

3.0 EXAMPLE EMBODIMENTS

Figure 3:
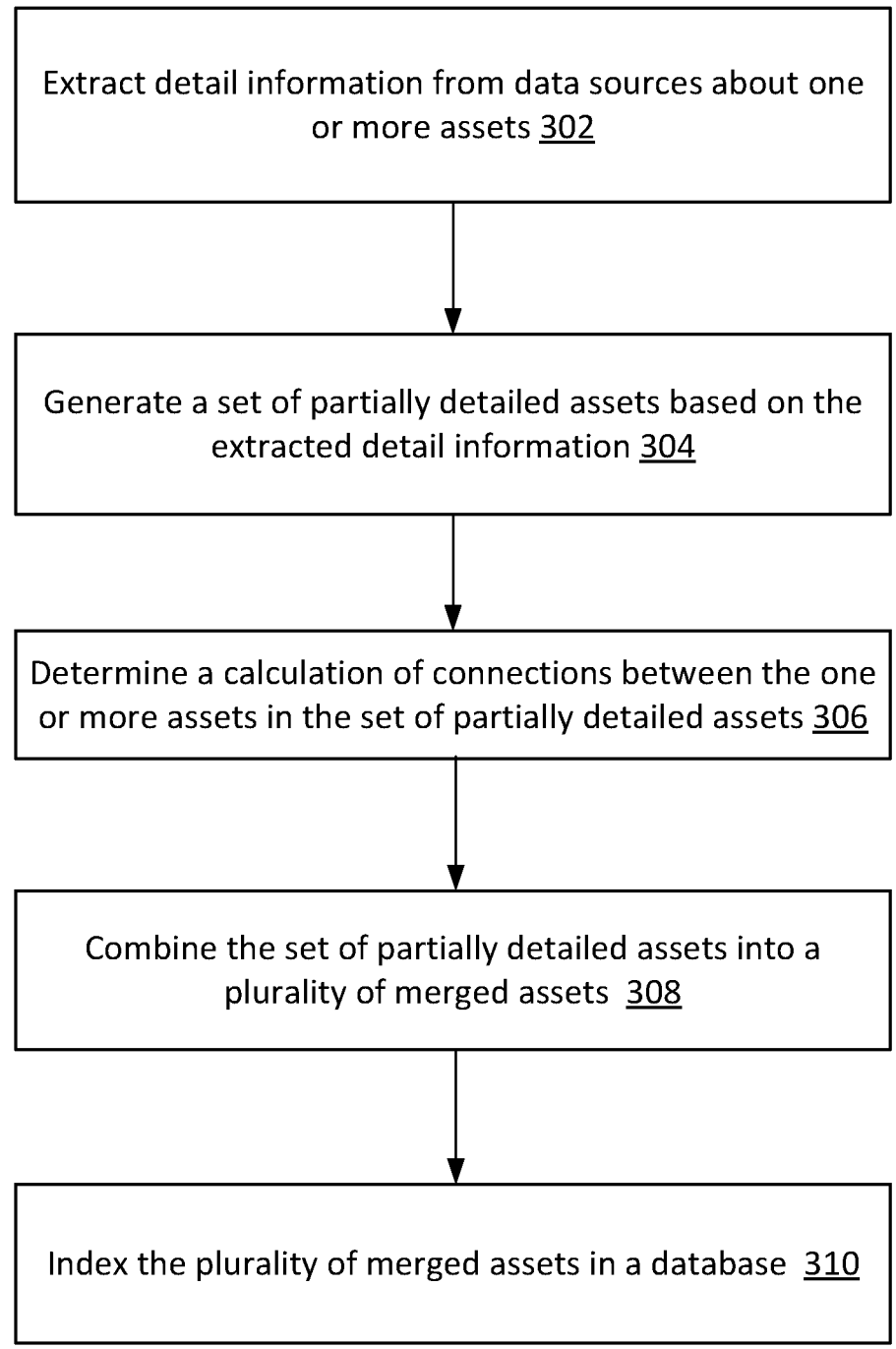
FIG. 3 illustrates an example process flow.

FIG. 3 illustrates an example process flow that may be implemented by a computing system (or device) as described herein. In block 302, a detail extractor 102 (e.g., 102 of FIG. 1, etc.) extracts detail information from data sources about one or more assets. Here, the detail extractor 102 may comprise one or more MapReduce converter jobs in the network analysis system 120. A MapReduce converter job may include a process that programmatically and automatically processes a large dataset using Apache Hadoop's work-horse computation paradigm, for example.

In block 304, the detail extractor 102 (e.g., 102 of FIG. 1, etc.) generates a set of partially detailed assets based on the extracted detail information.

In block 306, a calculation of connections between the one or more assets in the set of partially detailed assets is determined by the edge generator 110, asset feature combiner 114, and other techniques described with respect to the network analysis system 120. For example, an edge generator 110 may determine the highest betweenness centrality node for each cluster of related nodes as determined by the detail extractor 102. In another example, a simple scoring mechanism may be used to apply a pre-computed edge metric by the edge generator 110. In yet another example, an asset feature combiner 114 uses a reduce job or merger job to combine similar assets and a count of the combined messages is used as a metric for the strength of the edge between two nodes. In a further embodiment, a weighted linear combination of one or more features is used to pre-compute an edge between two asset nodes. Further, the asset feature combiner 114 and heuristics analyzer 122 may help determine a similarity metric for each pair of connected nodes which is used by the node centrality algorithm to determine the set of centroid nodes.

In block 308, the set of partially detailed assets is combined into a plurality of merged assets. For example, partially detailed assets having the same domain name are merged into a single asset. The combination of the partially detailed assets into merged assets is performed by a merge Reduce job in Hadoop, in an embodiment.

In block 310, the plurality of merged assets are indexed in a database by the indexed asset generator 116. The index may comprise a Solr index in a HBase (Hadoop) database, in one embodiment. In a further embodiment, a key is created in the process of indexing the merged assets to partition and sort the data based on the merged asset. In an embodiment, a merged asset is a Protobuf message.

Figure 4:
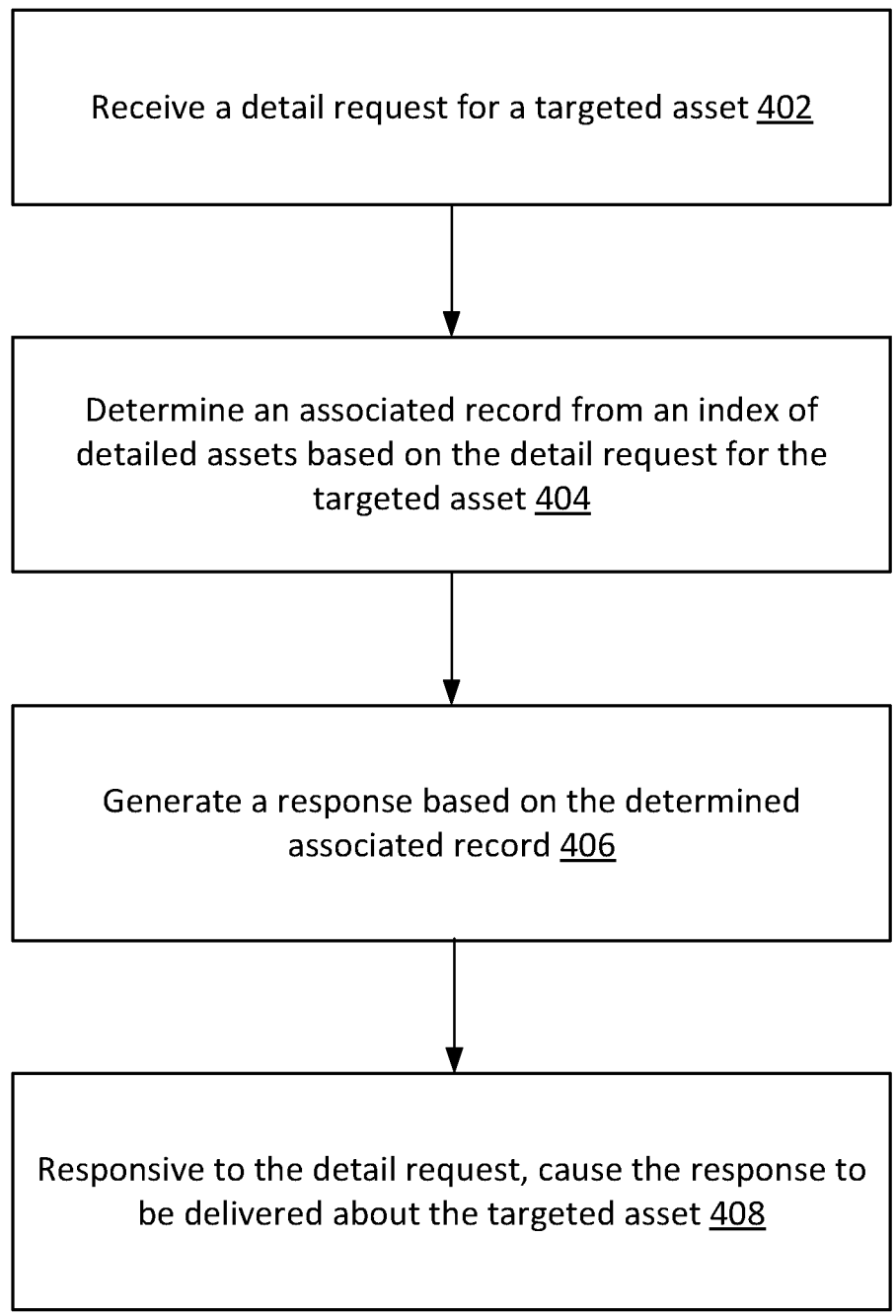
FIG. 4 illustrates an example process flow.

FIG. 4 illustrates another example process flow that may be implemented by a computing system (or device) as described herein. In block 402, a detail request for a targeted asset is received by the network analysis system 120 (e.g., 120 of FIG. 1, etc.). For example, a user may want to see detailed information about a particular domain name, such as "LionKing.com".

In block 404, an associated record from an index of detailed assets is determined based on the detail request for the targeted asset by an asset detail server 126. Because the indexed assets 180 in a database may be access sequentially by key, the lookup may be performed in the HBase database much faster than a random access storage method, in an embodiment.

In block 406, a response based on the determined associated record is generated by the asset detail server 126.

In block 408, responsive to the detail request, the response is caused to be delivered about the targeted asset by the network analysis system 120. The response may be in the form of a graphical image and/or a text response on a graphical interface provided by a graphical interface manager 132, or an application message on a client system 104 communicated through an API as provided by an API handler 118, in various embodiments.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
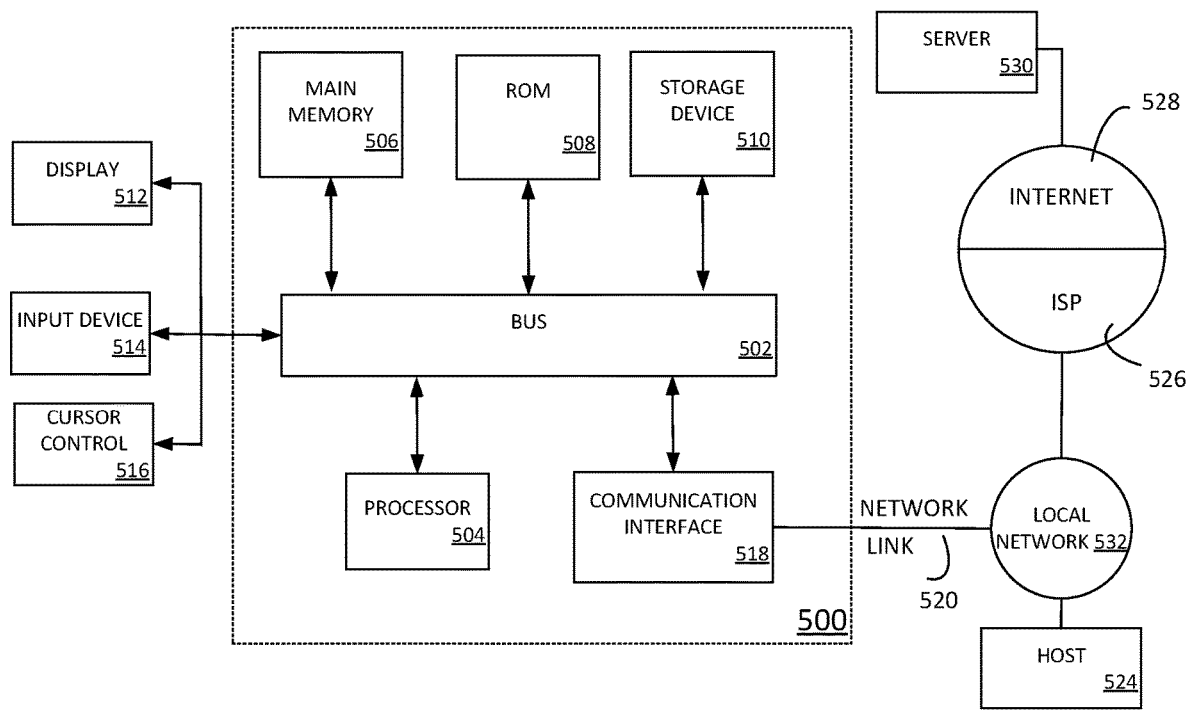
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    extracting detail information from a plurality of data sources about one or more assets;
    generating a set of partially detailed assets, which includes one or more components of one or more websites, based on the extracted detail information about the one or more assets, wherein the one or more components of the one or more websites define one or more objects in a document that is defined by a document object module (DOM);
    determining, for each pair of assets in the set of partially detailed assets, a calculation of one or more edges between the pair of assets in the set of partially detailed assets;
    combining the set of partially detailed assets into a plurality of merged assets, each merged asset of the plurality of merged assets combined from a subset of the set of partially detailed assets having a common characteristic; and
    storing the plurality of merged assets in an indexed database.

2. The method of claim 1, wherein the plurality of merged assets comprises a digital attack surface.

3. The method of claim 1, wherein the one or more assets comprise one or more identifiable web components.

4. The method of claim 1, wherein each calculation comprises a weighted linear combination of a number of features between two assets of the one or more assets.

5. The method of claim 1, further comprising:
    sending information associated with a merged asset to a third party vulnerability scanner; and
    receiving an analysis of the merged asset by the third party vulnerability scanner.

6. The method of claim 1, wherein the plurality of data sources comprises a public data source.

7. The method of claim 1, wherein the plurality of data sources comprises a private data source.

8. An apparatus comprising:
    an asset analytic evaluator, implemented at least partially by hardware, configured to:
        extract detail information from a plurality of data sources about one or more assets;
        generate a set of partially detailed assets, which includes one or more components of one or more websites, based on the extracted detail information about the one or more assets, wherein the one or more components of the one or more websites define one or more objects in a document that is defined by a document object module (DOM);
        determine, for each pair of assets in the set of partially detailed assets, a calculation of one or more edges between the pair of assets in the set of partially detailed assets;
        combine the set of partially detailed assets into a plurality of merged assets, each merged asset of the plurality of merged assets combined from a subset of the set of partially detailed assets having a common characteristic; and
        store the plurality of merged assets in an indexed database; and a network analytic component, implemented at least partially by hardware, configured to:
identify the one or more assets in a network.

9. The apparatus of claim 8, wherein the plurality of merged assets comprises a digital attack surface.

10. The apparatus of claim 8, wherein the one or more assets comprise one or more identifiable web components.

11. The apparatus of claim 8, wherein each calculation comprises a weighted linear combination of a number of features between two assets of the one or more assets.

12. The apparatus of claim 8, further comprising:
a data transmitter, implemented at least partially by hardware, configured to:
send information associated with a merged asset to a third party vulnerability scanner; and
receive an analysis of the merged asset by the third party vulnerability scanner.

13. The apparatus of claim 8, wherein the plurality of data sources comprises a public data source.

14. The apparatus of claim 8, wherein the plurality of data sources comprises a private data source.

15. One or more non-transitory computer-readable media storing instructions that, when executed by one or more computing devices, cause:
extracting detail information from a plurality of data sources about one or more assets;
generating a set of partially detailed assets, which includes one or more components of one or more websites, based on the extracted detail information about the one or more assets, wherein the one or more components of the one or more websites define one or more objects in a document that is defined by a document object module (DOM);
determining, for each pair of assets in the set of partially detailed assets, a calculation of one or more edges between the pair of assets in the set of partially detailed assets;
combining the set of partially detailed assets into a plurality of merged assets, each merged asset of the plurality of merged assets combined from a subset of the set of partially detailed assets having a common characteristic; and
storing the plurality of merged assets in an indexed database.

16. The one or more non-transitory media of claim 15, wherein the plurality of merged assets comprises a digital attack surface.

17. The one or more non-transitory media of claim 15, wherein the one or more assets comprise one or more identifiable web components.

18. The one or more non-transitory media of claim 15, wherein each calculation comprises a weighted linear combination of a number of features between two assets of the one or more assets.

19. The one or more non-transitory media of claim 15, storing instructions that, when executed by one or more computing devices, further cause:
sending information associated with a merged asset to a third party vulnerability scanner; and
receiving an analysis of the merged asset by the third party vulnerability scanner.

20. The one or more non-transitory media of claim 15, wherein the plurality of data sources comprises a public data source.

* * * * *